United States Patent [19]

Diassi et al.

[11] 3,912,726

[45] Oct. 14, 1975

[54] PROCESS FOR THE PREPARATION OF 7-[D-2-AMINO-2-(1,4-CYCLO-HEXADIENYL)ACETAMIDO] DESACETOXYCEPHALOSPORANIC ACID AND 7-[D-2-AMINO-2-(1,4-CYCLOHEXADIENYL)ACETAMIDO] CEPHALOSPORANIC ACID

[75] Inventors: Patrick Andrew Diassi, Westfield, N.J.; Manmohan Singh Atwal, New York, N.Y.

[73] Assignee: E. R. Squibb & Sons, Inc., Princeton, N.J.

[22] Filed: Feb. 16, 1973

[21] Appl. No.: 333,096

[52] U.S. Cl............................ 260/243 C; 424/246
[51] Int. Cl.$^2$.................................. C09D 501/20
[58] Field of Search...................... 260/243 C, 239.1

[56] References Cited
UNITED STATES PATENTS

| | | | |
|---|---|---|---|
| 3,352,858 | 11/1967 | Crast et al................ | 260/243 C |
| 3,485,819 | 12/1969 | Weisenburn et al........... | 260/243 C |
| 3,539,562 | 11/1970 | Diassi et al.................... | 260/243 C |
| 3,549,628 | 12/1970 | Chauvette..................... | 260/243 C |

*Primary Examiner*—Nicholas S. Rizzo
*Attorney, Agent, or Firm*—Lawrence S. Levinson; Merle J. Smith; Stephen B. Davis

[57] ABSTRACT

Processes for the preparation of 7-[D-2-Amino-2-(1,4-cyclohexadienyl)acetamido]desacetoxycephalosporanic acid and 7-[D-2-Amino-2-(1,4-cyclohexadienyl)acetamido]cephalosporanic acid are described utilizing N-(2,2,2-trichloroethyloxy- or t-butoxy-carbonyl)-D-α-dihydrophenylglycine and 7-aminodesacetoxycephalosporanic acid, 2,2,2-trichloroethyl or t-butyl ester or 7-aminocephalosporanic acid, 2,2,2-trichloroethyl or t-butyl ester, respectively.

7 Claims, No Drawings

PROCESS FOR THE PREPARATION OF 7-(D-2-AMINO-2-(1,4-CYCLO-HEXADIENYL) ACETAMIDO) DESACETOXYCEPHALOSPORANIC ACID AND 7-(D-2-AMINO-2-(1,4-CYCLOHEXADIENYL) ACETAMIDO) CEPHALOSPORANIC ACID

SPECIFICATION

In the continuing search to prepare improved antibiotics, recently two compounds have been prepared having excellent antimicrobial properties which are the subject of U.S. Pat. No. 3,485,819, issued Dec. 23, 1969. These compounds have the following structure:

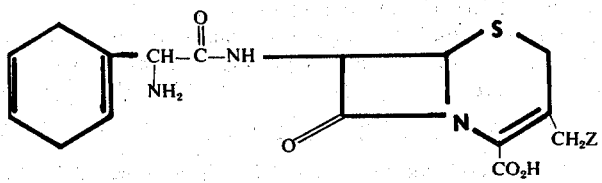

wherein Z is hydrogen (I) or acetoxy (II). In the case where Z is hydrogen, the preferred compound is 7-(D-α-amino-1,4-cyclohexadien-1-ylacetamido)desacetoxycephalosporanic acid (cephradine) (I), while when Z is acetoxy, the preferred compound is 7-(D-α-amino-(1,4-cyclohexadien-1-yl)acetamido)cephalosporanic acid (II).

This invention relates to a method for the convenient production of these useful antimicrobials.

More specifically, this invention relates to the following synthetic route:

wherein Z is as previously described; X and X' are $(CH_3)_3C-$ or $Cl_3CCH_2-$ with the provision that X and X' can not both be $(CH_3)_3C$ simultaneously, and R is lower alkyl.

In addition, this invention is intended to encompass the useful intermediates of this invention, that is compounds of the formula VI wherein Z is as previously described, X' is $Cl_3CCH_2$ and X is H, $(CH_3)_3C-$ or $Cl_3CCH_2$.

In this invention, the term lower alkyl is intended to mean a straight or branched hydrocarbon group of from 1 to 7 carbon atoms.

The compounds of the structure III are prepared by the reaction of t-butyl chloroformate or 2,2,2-trichloroethyl chloroformate with D-1,4-cyclohexadien-1-yl-glycine. The preparation of compounds III and IV, wherein X is $(CH_3)_3C-$ is described in Journal of Medicinal Chemistry 14 (1971) 117.

The process of this invention relates to the reaction of compounds of the type IV with compounds of the type V, wherein X is $(CH_3)_3C$ or $Cl_3CCH_2$ and X' is $Cl_3CCH_2$, to give compounds of the structure VI. This reaction is accomplished by the initial use of three solutions: (1) a lower alkyl haloformate in an anhydrous organic solvent, e.g., methyl chloroformate in anhydrous dimethoxyethane, diethyl ether or tetrahydrofuran, (2) the compound of the type V in an organic solvent, such as dimethoxyethane, diethyl ether or preferably tetrahydrofuran and (3) the compound of the type IV in an organic solvent, such as dimethoxyethane, diethyl ether or tetrahydrofuran and an acid acceptor such as sodium bicarbonate, trimethylamine or triethylamine ac-

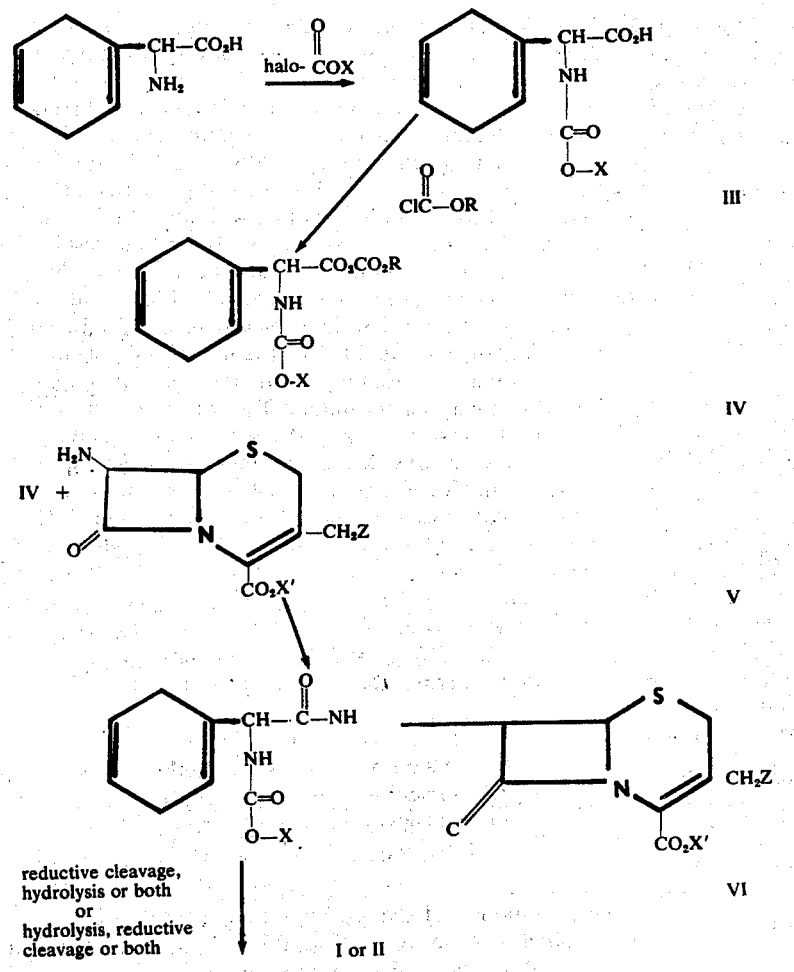

companied by a catalytic amount of a strong organic base, such as benzyldimethylamine, dibenzylmethylamine, or p-methoxybenzlamine.

While organic ethers are the preferred solvents, aromatic hydrocarbons, such as toluene, hydrocarbons, such as 3-methylpentane, halogenated hydrocarbons such as chloroform and carbon tetrachloride or other standard solvents such as dimethylformamide may be used. In choosing a solvent, one need only require that the solvent remain a liquid at the temperature the reaction is to be run at, that the solvent be inert to the reactants, and that it at least partially dissolve the reactants. The reaction is generally conducted from about 10° to about −50°C, preferably −25°C for from about 30 minutes to about 12 hours, preferably 4 hours.

Generally, solution 3 is slowly added to solution 1 and to this material solution 2 is slowly added.

In addition, this invention relates to the process involved in the systematic removal of the protective groups ($Cl_3CCH_2$ and $(CH_3)_3C$) from the compounds of the type VI wherein Z is as previously described, X is hydrogen, $(CH_3)_3C$ or $Cl_3CCH_2$ and X' is hydrogen, $Cl_3CCH_2$ or $(CH_3)_3C$ with the provisio that at least one group is $Cl_3CCH_2$.

When both X and X' are $Cl_3CCH_2$, the bis-trichloroethyl compounds are converted to compounds I and II by being dissolved in about 90 percent aqueous formic acid at from about 0° to about 10°C, and to this solution, zinc dust (about three to about ten times the weight of bis-trichloroethyl compound) is added slowly. Depending upon the rate of stirring, efficiency of cooling (heat transfer), etc., one must alter the rate of addition and length of stirring after the addition is complete to insure complete reaction. However, in typical laboratory scale preparations, addition periods of from 3 to 15 minutes coupled with an additional 15 minutes to about 4 hours to permit the reaction to go to completion are generally adequate.

When the compounds are such that either X is $Cl_3CCH_2$ and X' is $(CH_3)_3C$ or X is $(CH_3)_3C$ and X' is $Cl_3CCH_2$, they may be converted into compounds I and II by either of two routes. The first route involves an initial hydrolysis removing the $(CH_3)_3C$ group followed by a zinc dust/formic acid reduction carried out in the previously described manner to remove the $Cl_3CCH_2$. A second route involves the initial removal of the $Cl_3CCH_2$ group by the above described method utilizing zinc dust/formic acid followed by a hydrolytic removal of the $(CH_3)_3C$ group.

The hydrolysis is carried out in a polar organic solvent, preferably a nitroalkane (lower alkyl) or lower alkyl nitrile such as acetonitrile, a source of water and a strong organic acid, such as p-toluene-sulfonic acid or trifluoracetic acid. It should be noted that the water may be in the form of a hydrate, such as p-toluenesulfonic acid monohydrate. This reaction may be carried out at a temperature of from about 0° to about 50°C, preferably room temperature for from 1 to 24 hours.

It should also be noted that compounds I and II may also be prepared by a direct hydrolysis of compounds of the formula VI wherein X and X' are $(CH_3)_3C$.

This invention also encompasses the intermediates formed in the process of this invention having the structure:

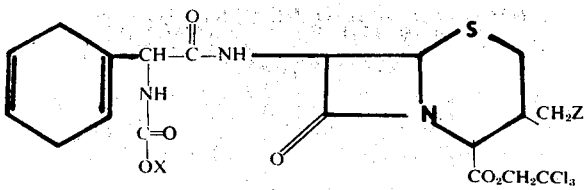

wherein Z is as previously described and X is $Cl_3CCH_2$, $(CH_3)_3C$ or hydrogen.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

2,2,2-Trichloroethyl-7-[N-(2,2,2-Trichloroethyloxycarbonyl)-D-α-(1,4-cyclohexadienyl)glycylamido]-3-Methyl-3-cephem-4-carboxylate.

Solution (A) Methylchloroformate (0.47 g, 5 mmole) in 40 ml tetrahydrofuran dried over calcium hydride.
Solution (B) 2,2,2-trichloroethyloxycarbonyl(1,4-cyclo-hexadienyl)glycine (1.64 g, 5 mmole) in 20 ml dry tetrahydrofuran triethylamine (0.4 g) + dimethylbenzylamine (2 drops).
Solution (C) 7-aminodesacetoxycephalosporanic acid, trichloroethyl ester (2.1 g, 6 mmole) in dry tetrahydrofuran.

PROCEDURE

To Solution (A) cooled to −25°C, solution (B) is added dropwise with constant stirring (during 15 minutes time). After about 40 minutes of stirring at −25°, solution (C) is then added dropwise with constant stirring (during 15 minute period). The resulting reaction mixture is then stirred between −20°C to −15°C for 3½ hours. The mixture is let warm to room temperature and stirred for an additional half an hour. The solvent is then removed on a flash evaporator and the residue is dissolved in 30 ml ethylacetate. The layer is washed with the following solutions: 2 × 50 ml 8% hydrochloric acid, 2 × 50 ml 5% sodium bicarbonate, 2 × 50 ml water and finally with 2 × 50 ml saturated sodium chloride solution. The resulting solution is finally dried over anhydrous magnesium sulfate. The solvent is removed on a flash evaporator, and the semi solid obtained is dried at 0.6 mm/Hg (r.t.) overnight, yield mole % is almost quantitative. The material is crystallized from ethyl acetate and pet-ether. A crystalline compound, pale in color 3.8 g; 81 mole % yield melting at 145°-147°C is obtained.

EXAMPLE 2

Conversion of 2,2,2-Trichloroethyl 7-[N-(2,2,2-Trichloroethyloxycarbonyl)-D-(1,4-cyclohexadienyl)glycylamido]-3-Methyl-3-cephem 4-carboxylate to Cephradine Process A
The compound of Example 1 (0.2 g; 0.31 mmole) is dissolved in 70 ml of 90% aq. formic acid at ice bath temperature and to the clear solution thus obtained is added (in several small portions) 1.0 zinc dust during a period of 15 minutes. The mixture is stirred at ice bath temperature for four hours, thereafter it is filtered under suction and the residue is washed with 2 × 5 ml 90% formic acid. The combined filtrate is concentrated to dryness, and the last traces of formic acid are removed by azeotroping with benzene. The solid residue is dissolved in 35 ml water, and the undissolved remaining solid is filtered off. The pH of the solution is adjusted to 2.0 and then $H_2S$ gas passed through the solution until precipitation of zinc sulfide is complete. The mixture after keeping at room temperature for 15 minutes is filtered through hyflo, and the filtrate is concentrated on a flash evaporator to dryness. The solid residue is dissolved in 15 ml of water and sodium hydroxide solution. The small amount of precipitate formed is filtered, and the filtrate is adjusted to pH = 4.4, and diluted with 3 volumes of acetonitrile. Stirring of the mixture is continued in an ice bath for 1 hour. A solid crystallizes out on seeding with cephradine which is filtered, washed with 2 × 0.2 ml water and dried at room temperature under 0.6 mm/Hg pressure. The colorless product weighs 40 mg; 38.5 mole % yield, m.p. 186°C–188°C (d).

Process B

The compound of Example 1 (0.2 g; 0.31 mmole) is dissolved in cold 90% aq. formic acid (70 ml). To the clear solution obtained is then added with constant stirring in an ice bath (in several small installments) 1.0 zinc dust during a period of 15 minutes. The mixture is stirred in ice bath for 1 hour. It is filtered under suction, and the residue washed with 2 × 5 ml 90% aq. formic acid. The combined filtrate is concentrated on flash evaporator and last traces of formic acid are removed by stripping off with 3 × 20 ml benzene. The solid residue is dissolved in 35 ml water and pH of the solution is adjusted to 2.0. Through this solution is passed $H_2S$ gas and the zinc sulfide which precipitates is filtered off via hyflo. The filtrate is concentrated to dryness, and the residue is dissolved in 35 ml acetonitrile. The pH of the solution is adjusted to 8.5 by means of triethylamine, any solids which separate out are now filtered. The filtrate is adjusted to pH 6.0 by means of 1N HCl. The solids crystallize out on stirring for one hour in an ice bath and are filtered, washed with 0.2 ml of water and dried at room temperature and at 0.6 mm/Hg for 6 hours. The colorless solid weighs 45 mg; m.p. 185°–187°C (d). Yield 43 mole %.

EXAMPLE 3

2,2,2-Trichloroethyl-7-[N-2,2,2-Trichloroethyl-oxycarbonyl)-D-α-(1,4-cyclohexadienyl)glycylamido]-3-acetoxymethyl-3-cephem-4-carboxylate According to Example 1, if one uses 7-amino-cephalosporanic acid, trichlorethyl trichloroethyl in place of 7-aminodesacetoxycephalosporanic acid, trichloroethyl ester, the title compound is obtained.

EXAMPLE 4

Conversion of
2,2,2-Trichloroethyl-7-[N-(2,2,2-Trichloroethyloxycarbonyl)-D-α-(1,4-cyclohexadienyl)glycylamido]3-acetoxymethyl-3-cephem-4-carboxylate to
7-[D-2-amino-2-(1,4-cyclohexadienyl)acetamido]cephalosporonic acid The compound of Example 3 is cleaved in the manner described in Example 2 to give the title compound.

EXAMPLE 5

2,2,2-Trichloroethyl
7-[N-(t-butoxycarbonyl)-D-(1,4-cyclohexadienyl)glycylamido]-3-methyl-3-cephem-4-carboxylate

MATERIALS

Solution (A) Methyl chloroformate (0.4 g) in 65 ml dry tetrahydrofuran.

Solution (B) N-t-butoxycarbonyl (1,4-cyclohexadienyl) glycine DHPG (1.11 g) in 60 ml tetrahydrofuran + triethylamine (0.4 g) + dimethylbenzylamine (2 drops)

Solution (C) 7-aminodesacetoxycephalosporanic acid 2,2,2-trichloroethyl ester (2.1 g) in 40 ml tetrahydrofuran.

METHOD

To Solution (A) cooled to −25°C, solution (B) is added with stirring (during 15 minutes). Stirring is continued between −20°C for 40 minutes, and then Solution (C) is added with stirring and in a dropwise manner to the above reaction mixture and then the mixture is stirred at −20°C to −15°C for an additional 3 ½ hours. Next the reaction mixture is stirred at room temperature for half an hour. The solvent is removed on flash evaporator, and residue is dissolved in 250 ml of ethyl acetate which is washed with 2 × 50 ml 5% hydrochloric acid, 2 × 50 ml 5% sodium bicarbonate solution, 2 × 50 ml water, 2 × 50 ml salt solution and finally dried over anhydrous $MgSO_4$. The solvent is removed on a flash evaporator and the semi solid residue is dried at 0.5 mm/Hg for 48 hours. A glassy material, weighing 27 g is obtained. Crystallization from ethyl acetate-Petroleum ether gives a product having m.p. 118°–120°C.

EXAMPLE 6

2,2,2-Trichloroethyl 7-[N-(t-butoxy carbonyl)-D-α-(1,4-cyclohexadienyl)glycylamido]-3-acetoxymethyl-3-cephem-4-carboxylate According to Example 5, if one uses 7-amino-cephalosporanic acid 2,2,2-trichloroethyl ester in place of 7-aminodesacetoxycephalosporanic acid 2,2,2-trichloroethyl ester, the title compound is obtained.

EXAMPLE 7

2,2,2-Trichloroethyl
7-[D-(1,4-cyclohexadienyl)glycylamido]-3-methyl-3-cephem-4-carboxylate The compound of Example 5 (1.0 g; 1.7 mmole) is dissolved in 60 ml of acetonitrile. To this solution p-toluene sulfonic acid monohydrate (1.0 g; 5.4 mmole) is added, and the mixture stirred at room temperature for 18 hours. The solvent is removed in vacuum, and the residue is dissolved in 80 ml ethyl acetate, the solution is cooled and washed with 2 × 25 ml 5% sodium bicarbonate solution and then with 2 × 15 ml water. The resulting solution is dried and solvent removed under vaccum. The pure product is soluble in dilute hydrochloric acid and is obtained in a yield of 75 mole % (0.61 g)

EXAMPLE 8

2,2,2-Trichloroethyl
7-[D-(1,4-cyclohexadienyl)glycylamido]-3-acetoxymethyl-3-cephem-4-carboxylate The compound of Example 6 is hydrolyzed in the manner described in Example 7 to give the title compound.

EXAMPLE 9

Conversion of 2,2,2-Trichloroethyl 7-[D-(1,4-cyclohexadienyl)glycylamido]-3-methyl-3-cephem-4-carboxylate to Cephradine The compound of Example 7 (1.3 g; 2.0 mmole) is dissolved in 80 ml of 90% aqueous formic acid. The solution is cooled in an ice bath. Zinc dust (1.9 g; 60 mg atoms) is added in several small portions with stirring, and the mixture is stirred in an ice bath for 1 hour. The zinc is filtered and washed with 3 × 5 ml 90% aqueous formic acid. The filtrate and the wash are combined and evaporated in vacuum. Last traces of formic acid are removed by azeotroping with benzene. The residue is taken up in 60 ml water and treated with hydrogen sulfide. The precipitated zinc sulfide is filtered with the aid of hyflo. The filtrate is adjusted to pH 7.2 and a slight precipitate formed is filtered and the filtrate is concentrated to half the volume. The pH is adjusted to 4.0, diluted with 35 ml acetonitrile, and cephradine crystallized out on stirring in ice bath for 1 hour. It is filtered and dried, weighing 0.72 g, (yield 70 mole %).

EXAMPLE 10

Conversion of 2,2,2-Trichloroethyl-7-[D-(1,4-cyclohexadienyl)glycylamido]-3-acetoxymethyl-3-cephem-4-carboxylate to compound II.

The compound of Example 8 is cleaved in the manner described in Example 9 to give Compound II.

EXAMPLE 11

7-[N-(t-butoxycarbonyl)-D-(1,4-cyclohexadienyl)glycylamido]-3-methyl-3-cephem-4-carboxylic acid The compound of Example 5 (1.0 g. 1.75 mmole) is dissolved in 50 ml 90% aqueous formic acid. To this solution in an ice bath, zinc dust (5.0 g) is added in several small portions. This mixture is then stirred in an ice bath for 1 ½ hours. The mixture is filtered to remove zinc, and the filtrate is concentrated on a flash evaporator with the last traces of formic acid being removed azeotropically with benzene. The residue is taken up in 20 ml water and 60 ml ethyl acetate, and the mixture is stirred in an ice bath. The ethyl acetate solution is washed with 2 × 20 ml 5% hydrochloric acid and then with 2 × 15 ml water, dried over $MgSO_4$ and evaporated to a semi solid material. This product on examination in TLC (using $CH_3CN-H_2O$; 4:1) contains a trace amount of starting material. This crude product is dissolved in water-ethyl acetate mixture by adjusting the pH to 7.5 with 2N sodium hydroxide. The aqueous layer is separated and back titrated to pH 2.7 with 1N hydrochloric acid in the presence of ethyl acetate. The ethyl acetate solution is dried and solvents removed, giving 0.58 g of almost pure product; yield 74.5 mole %. Crystallization from ether-heptane gives a product having a m.p. of 141°–142°C.

EXAMPLE 12

7-[N-(t-butoxycarbonyl)-D-(1,4-cyclohexadienyl)glycylamido]-3-acetoxymethyl-3-cephem-4-carboxylic acid The compound of Example 6 is cleaved in the manner described in Example 11 to give the title compound.

EXAMPLE 13

Conversion of 7-[N-(t-butoxycarbonyl)-D-(1,4-cyclohexadienyl)glycylamido]-3-methyl-3-cephem-4-carboxylic acid to Cephradine The compound of Example 11 (1.0 g; 2.29 mmole) is dissolved in 60 ml acetonitrile and treated with ptoluenesulfonic acid monohydrate (1.9 g; 10 mmole). The reaction mixture is stirred at room temperature overnight. The solution is cooled and 4 ml of water added and the pH adjusted to 5.2 by means of triethylamine. The stirring is continued for 1 hour, and the material which crystallizes is filtered, washed with cold acetonitrile and dried to constant weight. (0.54 g), yield 65.5 mole %.

EXAMPLE 14

Conversion of 7-[N-(t-butoxycarbonyl)-D-(1,4-cyclohexadienyl)glycylamido]-3-acetoxymethyl-3-cephem-4-carboxylic acid to Compound II.

The compound of Example 12 is hydrolyzed in the manner described in Example 13 to give compound II.

EXAMPLE 15

N-(2,2,2-trichloroethyloxycarbonyl)-D-α-(1,4-cyclohexadienyl)glycine

Dihydrophenylglycine (23.0 g; 150 mmole) is dissolved in 300 ml of water and to this suspension is added 160 ml of 1N sodium hydroxide solution. To this solution, ether (150 ml) is then added. This is designated as Solution A. This Solution A is then placed in a 3 l. three neck flask and cooled in an ice bath. 2,2,2-trichloroethylchloroformate (2.5 g, 200 mmole) is dissolved in 200 ml of dioxane (Solution B), and a 1N sodium hydroxide (200 ml) is designated as Solution C. Solutions (B) and (C) are added dropwise at the same time to Solution A with constant stirring, while the mixture is cooled in an ice bath. The addition is completed over a period of 1 hour. The reaction mixture is stirred for an additional 1 hour period in an ice bath. The resulting mixture is washed with 2 × 300 ml of ether. The aq. phase is then slurried with 350 ml ethylacetate in an ice bath and acidified to a pH 2.5 with syrupy phosphoric acid. The organic phase is separated, washed with 2 × 200 ml water and dried over $MgSO_4$. The solvent is removed on a flash evaporator and the residue dried under vacuum (36.5 g) yield 74 mole %. The material on crystallization from ethyl acetate and petroleum ether gives colorless crystals m.p. 150°C – 152°C.

What is claimed is:
1. A compound of the formula:

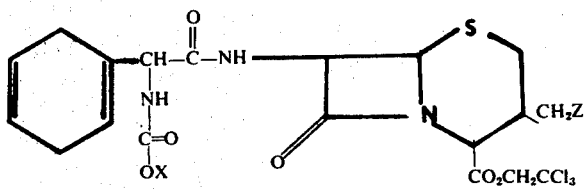

wherein Z is selected from the group consisting of hydrogen and acetoxy and X is selected from the group consisting of trichloroethyl, t-butyl and hydrogen.

2. A process for the preparation of a compound of the formula:

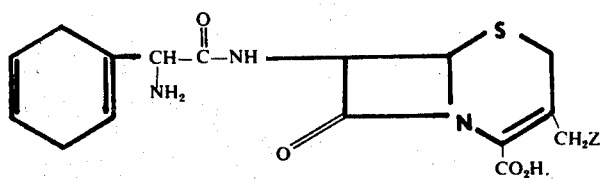

wherein Z is selected from the group consisting of hydrogen and acetoxy which comprises reducing a compound of the formula

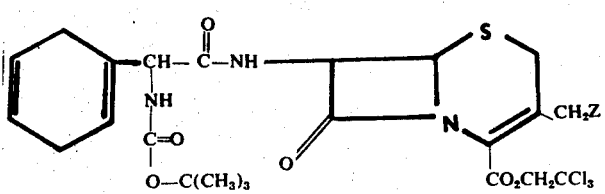

utilizing zinc dust and formic acid and hydrolyzing said product utilizing a strong organic acid and a source of water in an organic solvent.

3. The process of claim 2 wherein said strong acid and source of water is p-toluenesulfonate monohydrate.

4. The process of claim 3 wherein said organic solvent in the hydrolysis step is acetonitrile.

5. A process for the preparation of a compound of the formula:

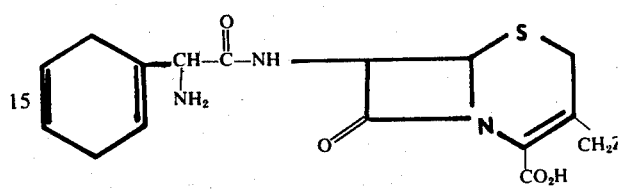

wherein Z is selected from the group consisting of hydrogen and acetoxy which comprises hydrolyzing a compound of the formula

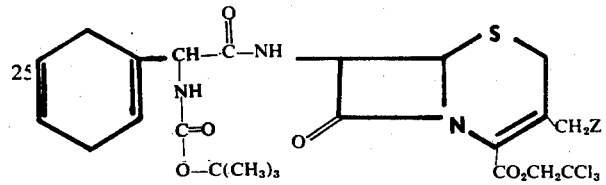

utilizing a strong organic acid and a source of water in an organic solvent and reducing said product utilizing zinc dust and formic acid.

6. The process of claim 5 wherein said strong acid and source of water is p-toluenesulfonate monohydrate.

7. The process of claim 6 wherein said organic solvent in the hydrolysis step is acetonitrile.

* * * * *

UNITED STATES PATENT AND TRADEMARK OFFICE
CERTIFICATE OF CORRECTION

PATENT NO. : 3,912,726

DATED : Oct. 14, 1975

INVENTOR(S) : Patrick Andrew Diassi, et al

It is certified that error appears in the above–identified patent and that said Letters Patent are hereby corrected as shown below:

The structure of claim 1 should read as follows:

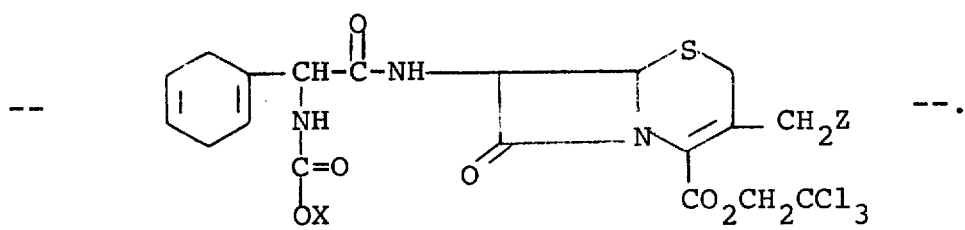

UNITED STATES PATENT AND TRADEMARK OFFICE
CERTIFICATE OF CORRECTION

PATENT NO. : 3,912,726
DATED : 10/14/75
INVENTOR(S) : Patrick Andrew Diassi, et al It is certified that error appears in the above-identified patent and that said Letters Patent are hereby corrected as shown below:

Col. 3, line 3, "p-methoxybenzlamine" should read --p-methoxybenzylamine--.

Col. 8, line 18, "ptol-" should read -- p-tol- --.

Signed and Sealed this first Day of June 1976

[SEAL]

Attest:

RUTH C. MASON
Attesting Officer

C. MARSHALL DANN
Commissioner of Patents and Trademarks